US008653938B2

(12) United States Patent  
Savry et al.

(10) Patent No.: US 8,653,938 B2
(45) Date of Patent: Feb. 18, 2014

(54) METHOD OF PROTECTION IN A CONTACTLESS RADIOFREQUENCY COMMUNICATION

(75) Inventors: Olivier Savry, Sassenage (FR); Pierre-Henri Thevenon, Grenoble (FR)

(73) Assignee: Commissariat a l'energie Atomique et aux Energies Alternatives, Paris (FR)

( * ) Notice: Subject to any disclaimer, the term of this patent is extended or adjusted under 35 U.S.C. 154(b) by 61 days.

(21) Appl. No.: 13/518,034

(22) PCT Filed: Dec. 15, 2010

(86) PCT No.: PCT/EP2010/069832
§ 371 (c)(1),
(2), (4) Date: Jun. 21, 2012

(87) PCT Pub. No.: WO2011/076644
PCT Pub. Date: Jun. 30, 2011

(65) Prior Publication Data
US 2012/0249296 A1      Oct. 4, 2012

(30) Foreign Application Priority Data
Dec. 23, 2009   (FR) ...................................... 09 06281

(51) Int. Cl.
*G05B 19/00*       (2006.01)
*H04Q 9/00*        (2006.01)
*G05B 11/01*       (2006.01)
*H04L 9/00*        (2006.01)
*H04K 1/00*        (2006.01)

(52) U.S. Cl.
USPC ........... 340/5.65; 340/5.63; 340/5.6; 340/5.8; 340/12.51; 380/268; 380/46; 380/270; 380/229

(58) Field of Classification Search
USPC ......... 340/5.61, 5.72; 713/185, 168; 455/296, 455/13.1, 13.4, 517; 331/176, 177 R
See application file for complete search history.

(56) References Cited

U.S. PATENT DOCUMENTS 7,099,366 B2 *   8/2006  Umeno .......................... 375/130
2001/0049791 A1 * 12/2001 Gascher ......................... 713/185
2003/0001723 A1 *  1/2003 Masudaya ..................... 340/5.61

FOREIGN PATENT DOCUMENTS

EP   1148190 A1   10/2001
EP   1271420 A2    1/2003

OTHER PUBLICATIONS

G.P. Hancke et al.: "An RFID Distance Bounding Protocol," Security and Privacy for Emerging Areas in Communications Networks, 2005. SECURECOM 2005. First International Conference on Athens, Greece Sep. 5-9, 2005, Piscataway, NJ, USA, IEEE, Sep. 5, 2005, pp. 67-73.

*Primary Examiner* — Steven Lim
*Assistant Examiner* — Pameshanand Mahase
(74) *Attorney, Agent, or Firm* — Baker & Hostetler LLP

(57) ABSTRACT

A method of protection of a near-field contactless communication system against malicious attacks. The method includes exchange of information between a reader and a contactless card of duration T, measured with respect to a starting instant t0 seen from the reader, decoding of this information by the card, sending by the card a return signal temporally set with respect to an instant t'0+T, where t'0 is the starting instant as seen by the card taking into account delays in propagation or processing of signals received from the reader, detection of the return signal by the reader, determination of the temporal setting of the return signal with respect to the starting instant t0, and interruption of communication by the reader if the temporal setting of the return signal detected is not equal to the instant t0+T with a predetermined margin of error. The return signal is a pseudo-random sequence.

20 Claims, 4 Drawing Sheets

METHOD OF PROTECTION IN A CONTACTLESS RADIOFREQUENCY COMMUNICATION

CROSS-REFERENCE TO RELATED APPLICATIONS

This application is a National Stage of International patent application PCT/EP2010/069832, filed on Dec. 15, 2010, which claims priority to foreign French patent application No. FR 09 06281, filed on Dec. 23, 2009, the disclosures of each of which are incorporated by reference in their entireties.

FIELD OF THE DISCLOSED SUBJECT MATTER

The invention relates to the protection of contactless communication systems against malicious intrusions.

BACKGROUND

The contactless communication systems concerned here are very short distance communication systems (typically a few tens of centimeters, or a few meters) used as means of identification, access authorization, payment, etc.

We shall mainly focus on RFID (Radio Frequency IDentification) systems defined by standards, but the invention more generally includes other similar communication systems, defined by other standards, such as NFC (Near Field Communication) telephones. RFID systems are essentially used to identify objects or persons carrying such objects, for authorizing access to a protected place for example; these systems comprise a reader and badges that are relatively passive but equipped with means of analyzing interrogation or command signals supplied by the reader and means of response from the badges to the reader; applications are access badges, travel cards, and marking labels, as well as electronic passports and even contactless bank cards; NFC telephones are essentially mobile telephones provided with an auxiliary function of payment at automated teller machines; they are typically intended to be used as means of payment by withdrawal from a bank account when they are placed near a machine for the automatic distribution of products or services or near a checkout till on a merchant's premises equipped with an ad hoc reader.

All these systems are based on communication in the air, via high frequency signals, between a contactless reader and a movable element which will be called hereafter a "card" regardless of its physical form which can be a card, a badge, a label, a mobile telephone, etc.

Transmission is most often through the intermediary of a radio frequency magnetic field and it uses an inductive antenna (a single coil of a few turns) forming part of the reader and an inductive antenna forming part of the card.

In these systems, the reader generally sends a radio frequency carrier, modulated according to a communication protocol to constitute a command signal; a typical carrier frequency in the case of contactless cards with an inductive antenna is 13.56 MHz, modulated in amplitude or in phase or in frequency, and hereafter it will be assumed that this is an amplitude modulation with a frequency of 13.56 MHz. The reader then waits for a response; if a card is present in the geographical area close to the reader and if the command signal involves a response from it, it responds and sends information back to the reader. The response may be the transmission of a simple digital identification, or it may be more complex.

The card may be lacking any stand-alone power supply, and in this case the power enabling it to transmit its response is provided inductively by the radio frequency magnetic field produced by the antenna of the reader via the antenna of the card, for short distance communication applications (up to several tens of centimeters).

The inductive antenna of the reader preferably acts as both a signal transmission antenna and a receiving antenna for detecting a modulation of the electromagnetic field induced by the response from the card. The response from the card is generally established in the form of a load modulation of its antenna, which leads to a modulation of the electromagnetic field, which in turn induces a change in the impedance of the antenna of the reader, as it is seen by the circuits of the reader connected to this antenna; it is this change in impedance which enables the detection then the analysis of the response.

Most often, a command signal transmitted by the reader is followed by a waiting time during which the reader transmits the unmodulated radio frequency carrier, then a response time from the card during which the reader continues to transmit the unmodulated carrier frequency but it is the response from the card that modulates the impedance.

The data transported in these systems are vulnerable since they pass through the air in the immediate environment of the reader. They may be threatened by malicious attacks aimed at collecting the data exchanged, or even at substituting a card other than the legitimate card in the dialog with the reader.

In a particular type of attack which hereafter will be called a "relay attack", the malicious person will try to make a contactless reader (legitimate reader) communicate with a legitimate card without the knowledge of its owner, indirectly, through the intermediary of another card (illicit or counterfeit card) and another reader (illicit or counterfeit reader). In some cases malicious communication can thus be established indirectly with the legitimate reader even though the legitimate card is not close to it, the counterfeit reader and the counterfeit card establishing a remote relay.

One of the weaknesses of current contactless devices is that they are always in a situation of being active; there is no off button to neutralize them. They can therefore be activated without the knowledge of their owner. A counterfeit reader near a legitimate card can activate the card. A secure transaction can thus be authorized indirectly without the cardholder having given their consent.

Encryption of transactions between the reader and the card does not protect against a relay attack since, in the relay attack, the counterfeit reader and the counterfeit card will pass the encrypted information transparently; they do not need to understand the content of encrypted messages, but simply retransmit them without decoding them; the legitimate reader is indeed communicating with the legitimate card but in an indirect way.

In practice, the following scenario can be envisaged: the counterfeit reader sends command signals to the legitimate card, by approaching it very closely; in a crowd for example, people are close to each other; the responses of the legitimate card are sent by the counterfeit reader to a counterfeit card which is placed near the legitimate reader and this card retransmits these responses to the legitimate reader; the legitimate reader therefore believes it has the legitimate card before it; likewise, the commands of the legitimate reader are sent by the counterfeit card to the counterfeit reader. The entire communication is intercepted. The connection between the counterfeit card and the counterfeit reader may take place by wire or by radio. Communication can even take place via mobile telephone or via the Internet, provided, however, that the counterfeit card does not merely amplify and retransmit the signals but is provided with means for demodulation and re-modulation (but not necessarily decryption) for restoring the signals into the appropriate transmission protocol (GSM or Internet protocol) before sending them. The attack can then be carried out at long distance without the encryption means preventing it.

To avoid these attacks, the following methods have been devised:

using an ultra-wideband (UWB) radio transmission the distance is measured between the card and the reader; the objective is to verify that the legitimate card is near the reader; the first phase of the communication is a normal authentication phase; the second phase comprises a very fast exchange of interrogations and responses for measuring the delay between interrogation and response and verifying that it is not too long, which would be a sign of the presence of an intermediate relay; this solution adds significant complexity to the RFID system, and notably to the RFID card;

in another method, the time is measured between the end of the transmission of the request by the transmitter, and the start of the response by the card; this makes it possible to measure times with an accuracy of about half the signal period; but the instant of response of the card is not necessarily always properly set in the communication protocol, making it necessary to take large margins of uncertainty;

means can be provided for the card to be deliberately deactivated by the user when it is not in use; notably provision can be made for the card to be normally stored in a billfold with a Faraday cage structure preventing any communication;

other solutions have been proposed in relation to keys for opening automobile doors, but these solutions cannot be applied to most RFID systems.

A system of protection against car theft has also been proposed in patent publication EP1271420, in which the card reader sends the card information on waiting time to be observed before responding; the card receives this information and responds only after this time; the reader verifies that the response arrives in a time slot that it itself has set.

SUMMARY

The invention proposes improving systems of this type by increasing security against attempts at detecting the sending of this time information and by increasing the accuracy of measurement of the instant of arrival of the response from the card.

The invention therefore aims to provide a method of protection of a near-field contactless communication system (RFID or the like) against malicious attacks, which is simple, effective, and difficult to circumvent fraudulently.

According to the invention therefore a method is provided for the protection of communication between a contactless card reader and a card, which comprises the exchange between the reader and the card of information on a chosen value of duration T, measured with respect to a starting instant t0 seen from the reader side, the decoding of this information of a value of duration T by the card, the sending by the card of a return signal temporally set with respect to an instant t'0+T, where t'0 is the starting instant as seen by the card taking into account delays in propagation or processing of the signals received from the reader, the detection of the return signal by the reader, the determination of the instant of arrival of the return signal with respect to the instant t0+T, and the interruption of the dialog by the reader if the instant of arrival of the return signal detected is not equal to a theoretical instant of arrival of the return signal with a predetermined margin of error (−dT1, dT2), this method being characterized in that the return signal is a pseudo-random sequence known to the reader, and in that the determination of the instant of arrival of the return signal with respect to the instant t0+T comprises a search for maximum temporal correlation between the return signal and a pseudo-random sequence temporally offset with respect to the instant t0+T, the temporal offsetting of the sequence providing a maximum of correlation defining the instant of arrival of the return signal.

Preferably, the reader and the card possess generators of identical pseudo-random sequences generated from a random number, and the random number is transmitted by the reader to the card for the card and the reader to establish identical pseudo-random sequences with a view to the search for correlation.

The exchange between the reader and the card is preferably the sending of information on the duration T by the reader to the card but it can also be from the card to the reader.

The reference which defines the instant t0 is known a priori by the reader and by the card: it is for example, for the reader, simply the end of the command by which the reader transmits the information T to the card, and this end is the last binary transition in the modulation which defines this command. For the card it is the same thing, with a slight temporal offset due to propagation and demodulation. However, it is preferable for the reference of instant t0 to be defined by a specific synchronization signal, for example a synchronization pulse, transmitted by the reader and recognized by the card; the best situation is for this synchronization signal to be sent by the reader after a random time interval.

The information of duration T is preferably transmitted in encrypted form for greater security against piracy. It is preferably modified by the reader from one dialog sequence to another.

For this, the exchange protocol between the reader and the card preferably comprises a command sent by the reader to the card, including the sending of a random number used to calculate both in the reader and in the card, by means of the same secret key algorithm, the duration T; then the sending by the reader, at the end of a random time, of a synchronization pulse defining the starting time t0 of the duration T seen from the reader side.

The response from the card, expected by the reader at instant t0+T (or very shortly after) is the transmission of a pseudo-random modulation sequence known to the reader; the reader is capable of generating an identical pseudo-random sequence set with respect to instant t0+T, to temporally correlate this sequence with the pseudo-random sequence received from the card, to determine an instant tr for which there is a correlation peak, and to determine whether the difference between tr and the theoretical instant where the response is expected from the card is within the accepted margin of error or not.

The generation of an identical pseudo-random sequence in the reader and in the card is carried out based on identical generators in the reader and in the card, and it preferably uses a particular code which univocally defines the sequence transmitted by the generator. This code is sent in advance by the reader to the card, or vice versa, and preferably in encrypted form, decryptable by the card. The random number sent by the reader for use in the calculation of the duration T can also be used to determine, in both the reader and the card, the pseudo-random sequence, using a secret key algorithm, shared by the reader and the card, using this random number.

In a particularly advantageous application, the card reader is fitted on a vehicle and controls the opening and/or starting of the vehicle.

BRIEF DESCRIPTION OF THE DRAWINGS

Other characteristics and advantages of the invention will appear on reading the detailed description which follows and which is made with reference to the accompanying drawings in which.

DETAILED DESCRIPTION

It is assumed for simplicity that the contactless card and the reader work on the following well-known principle: the reader and the card each possess an inductive antenna, and the reader is capable of modulating a carrier frequency for transmitting information from its antenna to the antenna of the card; the card is capable of generating a load modulation and therefore an impedance modulation of its inductive antenna; this modulation is passed on in the form of an impedance modulation of the antenna of the reader; and the reader is capable of detecting this modulation. The invention is usable, however, even if the physical principles underlying the communication are different. The modulation, in the course of the dialog protocol between the reader and the card, is preferably an amplitude modulation of a subcarrier frequency.

The normal dialog protocol between a card reader and a contactless card in principle comprises the following four phases repeated for each command sent by the reader to the card:

1. transmission time of a command, in the form of an amplitude modulation of the subcarrier frequency;
2. waiting time of the reader, during which the reader sends the unmodulated carrier frequency and during which the card decodes the command received from the reader;
3. response time by the card, for example in the form of an impedance modulation of its antenna, which is passed on to the impedance seen by the reader;
4. waiting time of the card, during which the reader decodes the response received from the card.

The modulations from the card to the reader are generally amplitude modulations of a subcarrier frequency of the carrier frequency. From the reader to the card they are generally amplitude modulations of the carrier.

A carrier frequency of 13.56 MHz is frequently used. An 847.5 kHz subcarrier may be used.

The invention is applicable with any other type of modulation. In the case where the card is active (for example an NFC mobile telephone) the exchanges from the card to the reader (notably a return signal from the card) can be constituted by a modulation of an electromagnetic field transmitted by the card itself.

Figure 1:
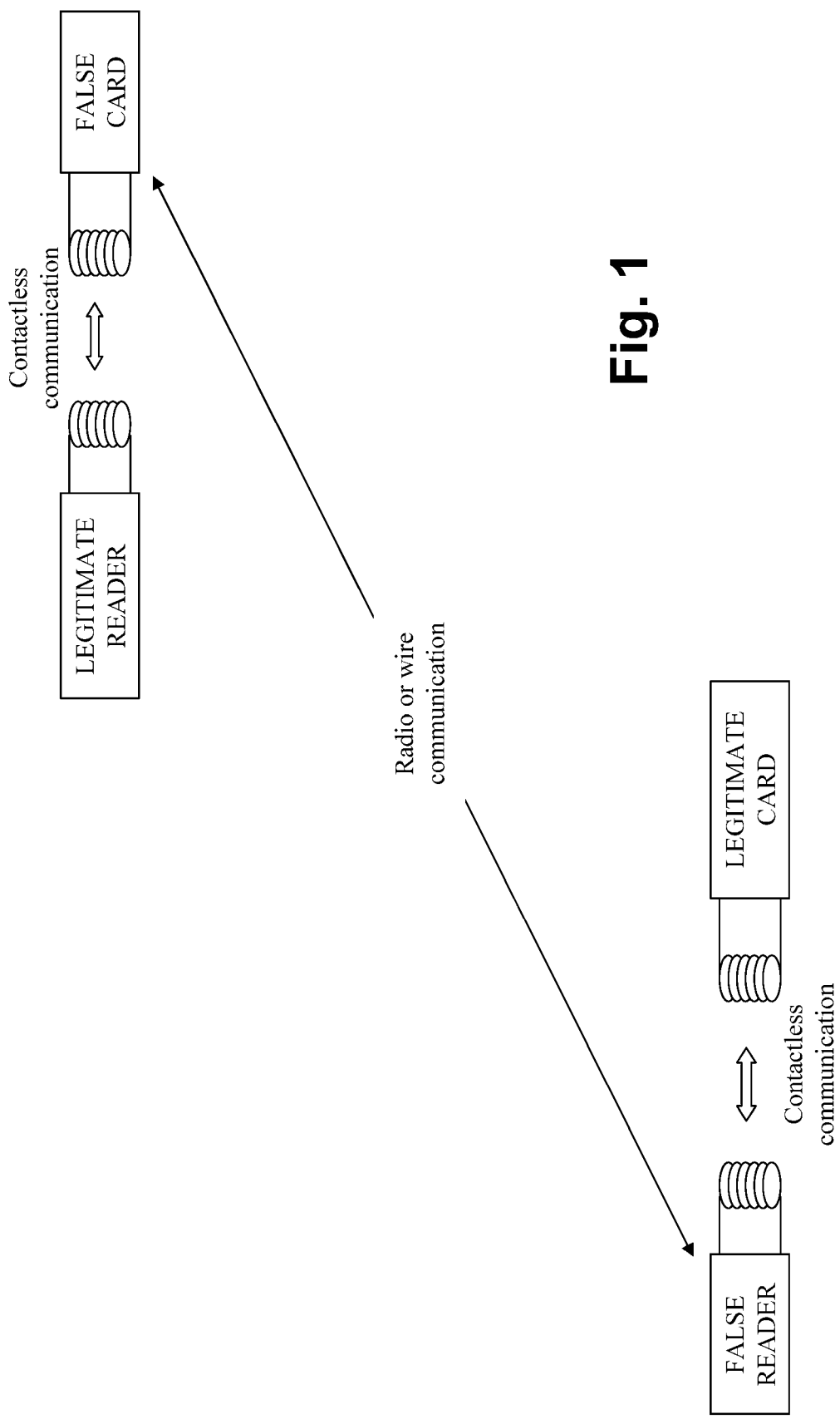
FIG. 1 shows the general principle of a relay attack.

FIG. 1 shows the principle of a relay attack aimed at persuading the card reader that it has before it a legitimate card whereas it is a counterfeit card that is present.

The (legitimate) reader 10 is shown symbolically with its inductive antenna 12. The legitimate card 20 is shown with its inductive antenna 22. The relay attack is conducted by the combination of a counterfeit card 30 with its inductive antenna 32 and a counterfeit reader 40 with its inductive antenna 42. The legitimate reader 10 sends commands that are captured by the counterfeit card 30; this passes them on to the counterfeit reader 40 by wire or by radio; the counterfeit reader 40 is fraudulently moved close to the legitimate card and transmits the commands to it from the legitimate reader; the legitimate card then responds; the responses are retransmitted from the counterfeit reader to the counterfeit card, and from the counterfeit card to the legitimate reader.

The legitimate reader then believes it has the legitimate card before it.

According to the invention, in the course of a specific command, or as an element of each command, the legitimate reader exchanges information with the card over a duration T that the card must count from an instant t0. The exchange preferably takes place from the reader to the card but it could be the opposite. The instant t0 can be predefined in the system, i.e. the reader does not need to send information on time t0. But the value of the duration T can be defined randomly by the reader (or the card). The instant t0 can be the instant of the end of the command sent, which can be the last binary transition of the modulation defining the command, before a response waiting time of the card; the card knows that it is from this last transition that it must count a time T. But it will be seen later that it is preferable for the instant t0 to be an instant defined by a specific synchronization pulse sent by the reader after the end of the command.

The duration T is preferably less than the duration of the waiting time of the reader (time 2 defined above), but this is not mandatory as explained below.

The information of duration T is transmitted either in the form of a binary digital value expressed in units of time or in the form of a digital value N expressed in numbers of periods of the carrier frequency, or in an encrypted form, i.e. in practice in the form of sending a number which is used to calculate a duration in the card, by means of a secret key algorithm.

The card detects the instant t0 but there is a slight offset between the time t0 seen by the reader and the corresponding time t'0 by the card, due to propagation delays (extremely short in view of the short distances) and demodulation delays in the card. The card is arranged to trigger a counter that counts a duration T from the instant t'0 and to send at the time t'0+T a return signal recognizable by the reader. Counting may be done by counting periods of the carrier frequency, for example by counting the passages through zero. Counting may begin before the card has decoded the value T, provided that the decoding is completed before the time T.

The time T is chosen to be well above the duration likely to separate two successive binary transitions (in the same direction) in the code that defines the commands or information sent by the reader. This enables the card to accurately define the instant of the end-of-command time t0 sent by the reader. The following procedure can be used, for example if the end of a command frame corresponds to a rising edge (but this could be a falling edge) of the binary modulation: at each transition the counter that counts the time T is reset to zero, and is allowed to resume counting. Thus, the time count cannot go as far as T while modulation continues. Only the last transition enables the counter to count a complete duration T.

The card therefore counts a time T from a time t'0 which is that at which it sees the end of the command sent by the reader. Given the close proximity of the card and the reader, and given the very short time necessary for the detection of binary transitions by the card, the time t'0 is practically equal to the time t0. The difference between t0 and t'0 may be equal to one or two periods of the carrier frequency.

At the time t'0+T, the card sends the return signal, easily recognizable by the reader, for example because it is an amplitude modulation of the carrier frequency, whereas the ordinary dialog between the reader and the card is in the form of a modulation of the subcarrier frequency. The return signal is here a pseudo-random sequence transmitted by the card and expected by the reader.

The verification made by the reader consists in verifying that the return signal arrives at an instant tr which is actually the instant expected, i.e. globally at the instant t0+T, or if the incompressible times of transmission, propagation and reception of signals are taken into account, an instant tr0=t0+T+Δt. The maximum accepted margin of error between tr and tr0 is predetermined in the system. This margin can be broken down into two durations −dT1 and +dT2 located respectively before and after tr0 and this is what will be considered in what follows, with dT=dT1+dT2; but it could alternatively be counted in the form of a single time interval dT located after tr0 if it is considered unlikely that the return pulse will arrive before tr0. The values dT1 and dT2 may preferably be one or two, or even three, periods of the carrier frequency (period equal to 73 nanoseconds for the frequency of 13.56 MHz).

If the return signal is located at an instant tr within the margin dT, i.e. between tr0−dT1 and tr0+dT2, the pulse is considered as originating from a legitimate card. If it is not located in this interval, it is considered as originating from a card that could have been the subject of a relay attack. The margins of error dT1 and dT2 may or may not be identical.

We shall return later to the determination of the instant tr representing the arrival of the return signal constituted by a pseudo-random sequence. This determination is made by temporal correlation between the return signal (a pseudo-random sequence) and an identical pseudo-random sequence produced in the reader.

If the reader detects a relay attack by this means, it interrupts the communication or takes appropriate measures to neutralize the attempt at fraudulent use of the legitimate card.

Figure 2:
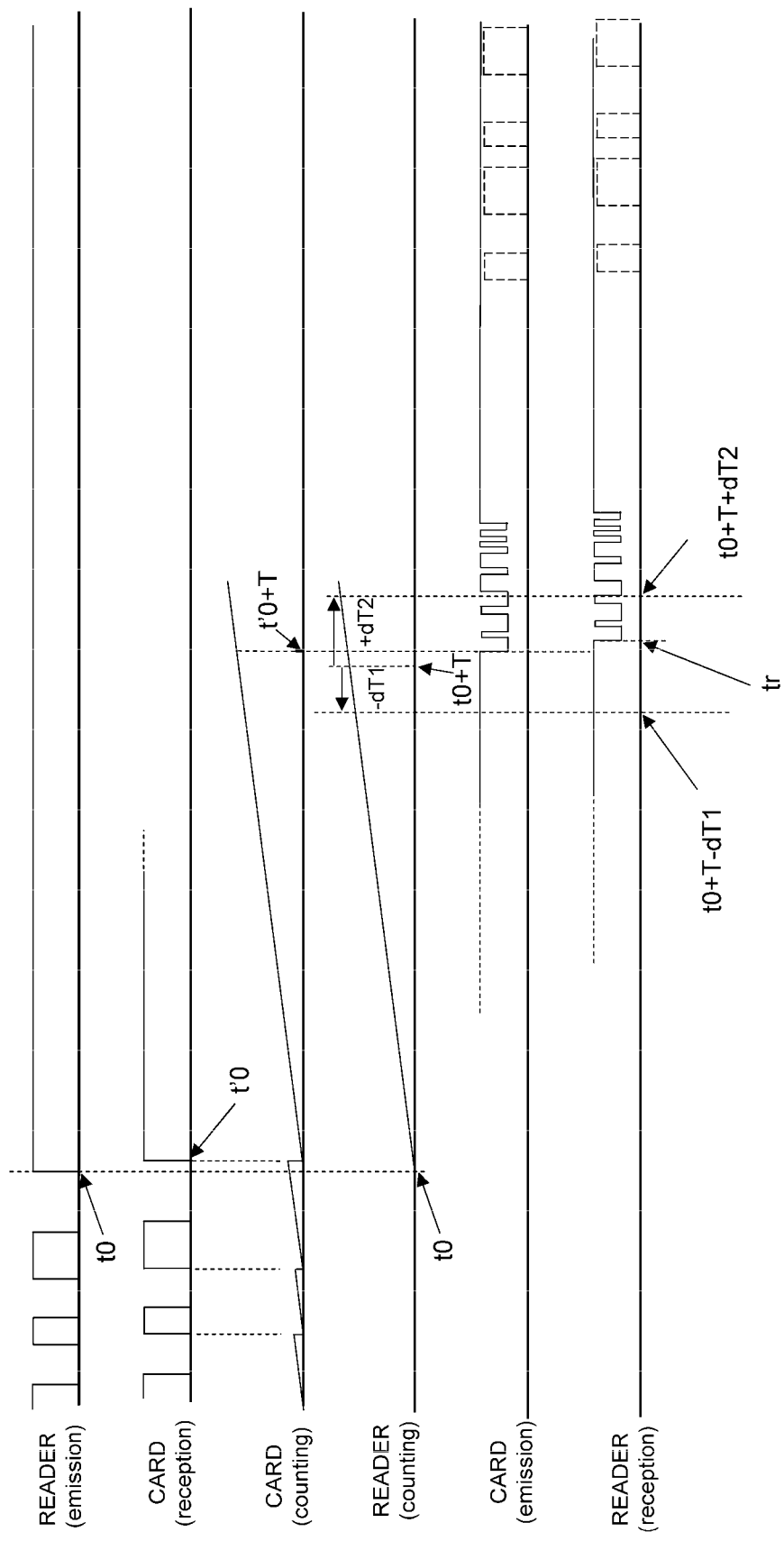
FIG. 2 shows a temporal diagram used according to the invention in the communication between the reader and the card with a view to better protecting the card against a relay attack.

FIG. 2 is a timing diagram schematically summarizing the operations just described, in a case where the starting instant t0 is defined by the end of a command sent by the reader to the card. It will be seen later that the starting time t0 can be defined by a synchronization pulse recognizable by the card and sent at the end of a random time T', after the end of the command.

The first line represents the transmission of a command by the reader, a command which is followed by a waiting time during which the reader transmits an unmodulated carrier (represented in the drawing by the fact that the modulation signal remains at the high level). The command ends at the time t0. The reader then waits first for the return pulse from the card, and secondly for a response to the command. The modulation by the reader is here an amplitude modulation of the carrier. The command includes information on the time T, unless such information has been transmitted during a previous command and is still valid for this command.

The second line represents the signal originating from the reader, as it is demodulated by the card. The same modulation as that of the reader has simply been shown, but slightly delayed, i.e. it ends at an instant t'0 subsequent to t0.

The third line represents a count which is triggered in a counter of the card at each positive transition of the modulation received, the true count of the duration T starting only at the time t'0 since beforehand the count is reinitialized at each positive transition. The value of T has been decoded by the card from the command received or from a command previously received. Counts are shown symbolically by linear ramps.

The fourth line represents a count triggered in the reader at the end of the transmitted command (t0). The count may start at each positive transition and be reinitialized at each positive transition (as in the card), or else it may start only at the time t0 because the reader knows (unlike the card) when the command that it is transmitting ends.

The fifth line represents the transmission by the card of a modulation constituting a return signal starting at the time t'0+T. The return signal is a pseudo-random sequence. Also shown, in dotted lines, after the return signal, is a modulation which is the response from the card to the command from the reader. The modulations are preferably modulations of the impedance of the inductive antenna of the card, but it is preferably a modulation of the carrier frequency with regard to the pseudo-random sequence and a subcarrier modulation with regard to the true response from the card to the command.

The sixth line represents the signal received and demodulated by the reader, comprising a pseudo-random sequence starting at an instant tr and a subsequent subcarrier modulation (dotted lines) originating from the card.

If the return signal does not arrive within a time interval between t0+T−dT1 and t0+T+dT2, i.e. a time interval around a theoretical reception time tr0 close to t0+T, a relay attack is considered as potentially present and the communication with the card is interrupted, at least with regard to the sending of critical data.

In the method according to the invention, a partial immunity against relay attacks stems from the fact that some relay attacks will introduce additional reaction times preventing the reader from receiving the return signal from the card in the time slot located between t0+T−dT1 and t0+T+dT2.

Additional immunity is obtained when the information of duration T varies over time, particularly when this information is determined from a random or pseudo-random signal. And an additional immunity is further obtained if the information T is sent to the card in encrypted form using an encryption that only a legitimate card can decode. The encryption may moreover be simple: for example, if the reader and the card possess a shared encryption key, the reader can send the card the result of an exclusive OR between the key and the value of T; this result can be decrypted very easily by the card using the key.

The return signal transmitted at the time t'0+T by the card is a pseudo-random modulation sequence starting at the time t'0+T. The reader detects this sequence and performs a search for optimal correlation with an identical random sequence. The correlation is preferably digital, i.e. the sequence received by the card is digitized and the search for correlation is performed by multiplying the digitized sequence by various digital sequences identical to each other but progressively offset in time. The search for optimal correlation consists in determining the temporal position tr of the sequence which gives the highest correlation product with the sequence received from the card. This temporal position tr is referenced, for example, with respect to the start of the pseudo-random sequence; it is compared with the time t0+T and is considered as normal if tr is between t0+T−dT1 and t0+T+dT2, dT1 and dT2 being the accepted margins of error. Otherwise, the reader considers that the card may be the subject of a relay attack and it interrupts the normal operation of the communication.

The temporal correlation of pseudo-random sequences provides great accuracy of time measurement. The sequence can be an m-sequence enabling a fine and easily detectable correlation peak to be created.

Figure 3:
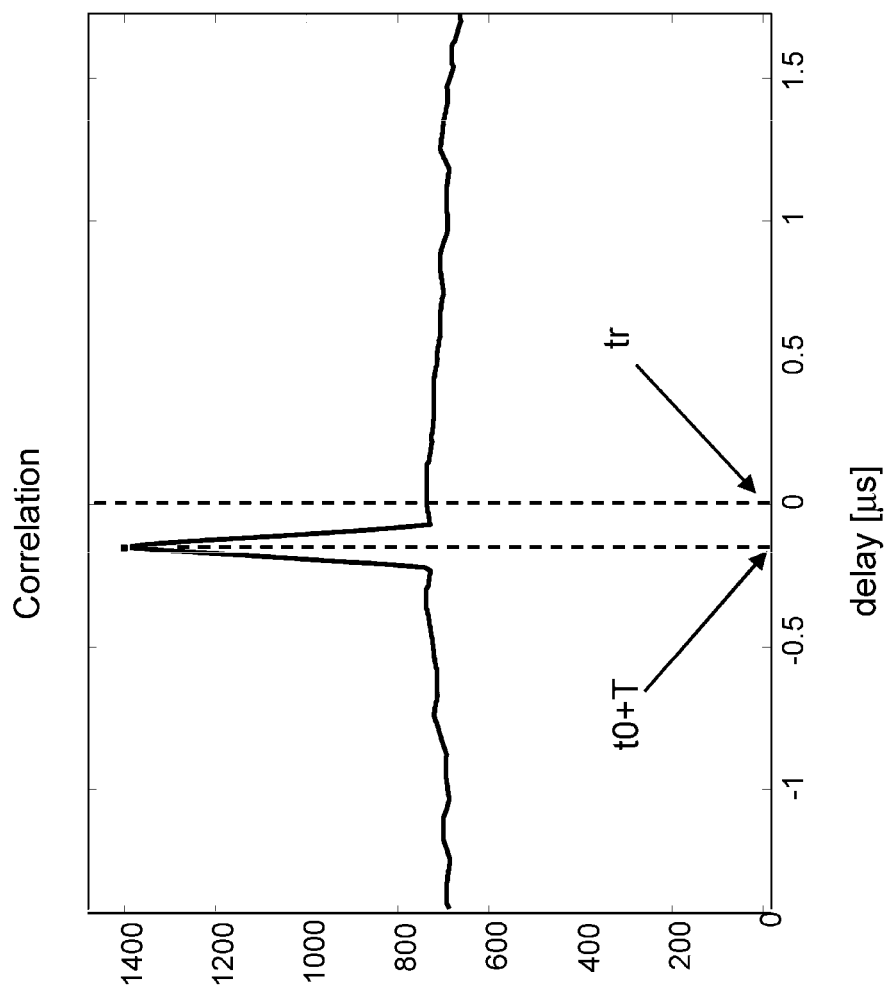
FIG. 3 shows a correlation peak detected when the received pseudo-random sequence is correlated with identical sequences offset in time.

FIG. 3 shows by way of an example a correlation peak (arbitrary units in the ordinate) that can be detected when the received pseudo-random sequence is correlated with identical sequences offset in time. The width of the correlation peak is equal to the duration of the shortest pulse present in the sequence. The determination of the precise position of the top of the peak is performed with an accuracy much greater than this duration. If the modulation is applied to the carrier frequency, the duration may be 73 nanoseconds and the accuracy of detection of the return from the card is much better than 73 nanoseconds.

The temporal offsets that are applied to the pseudo-random sequence of the reader have been shown in the abscissa and the amplitude of the correlation signal between the offset sequence and the signal received in the ordinate.

The correlation takes calculation time, but even if the result of the correlation and the decision not to continue the dialog are taken after one or more sequences of sending commands by the reader to the card, the interruption of the dialog will be effective before any critical exchanges (from the security point of view) have taken place.

The transmission of the pseudo-random sequence by the card can further be repeated on several successive sequences to improve the correlation, even during the dialog of the card with the reader if the modulation by this pseudo-random sequence is a modulation of the carrier and is not mixed up with the modulation of the subcarrier.

Additional security may be introduced by providing for the reader and the card to have generators of identical pseudo-random sequences controllable by a code consisting of a few bits with a one-to-one relationship between the command code and the transmitted sequence. This code consisting of a few bits is transmitted in encrypted form (at the same time as the information of duration T) to the card so that the latter establishes an identical sequence. If the sequence sent by the card is not that expected by the reader, no sufficiently marked correlation peak will be found. The code transmitted by the reader for this purpose can be used not only for the selection of a pseudo-random sequence in the reader and in the card, based on the same selection algorithm, but also for the selection of a waiting duration T, calculated by the reader and the card based on the same calculation algorithm. These algorithms are based on the use of a random number (the binary code mentioned above) transmitted in clear by the reader, and a secret key known to the reader and the card. The function of the algorithms is univocal, i.e. a given code leads to a single duration T and a single pseudo-random sequence.

Figure 4:
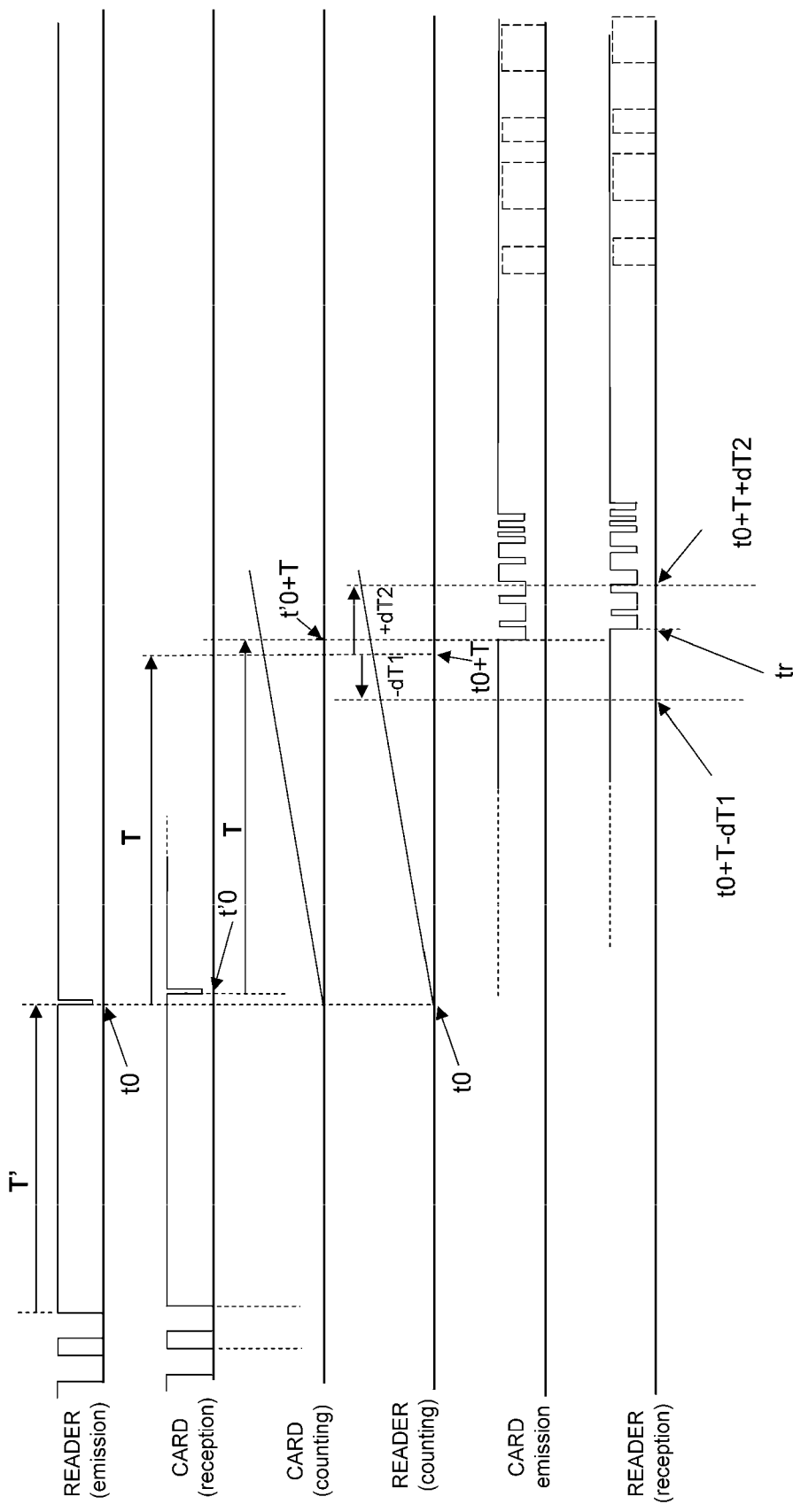
FIG. 4 shows an exchange protocol with a delay T', between the end of a command sent by the reader and a synchronization pulse to the card.

FIG. 4 represents an additional refinement according to which the instant t0 for the start of counting of the duration T is not the end of the transmission of a command sent by the reader to the card, but is an instant separated from this end of command by a duration T' which is randomly generated by the reader. The duration T' ends with the transmission of a synchronization pulse by the reader at the instant t0; the instant t0 is therefore variable from one interrogation to the next since it is randomly determined by the reader; the card is waiting for this pulse and starts its count of the duration T at the instant t'0 when it receives the synchronization pulse. The reader starts the same count at the instant t0 as has been explained with reference to FIG. 2. For the rest, the operation is the same as in FIG. 2.

This random time T' makes it possible to prevent an attacker predicting the instant t0 and sending a synchronization signal just before the reader does, which would enable the attacker to compensate for the delays that the relay introduces.

To sum up now the entire protocol, with the additional security thus introduced, we have the following steps:

The reader sends a command or request to the cards that may be present in the field of the reader. In this command, the reader sends an arbitrary number A, randomly generated so different from one command to the next.

The card receives the command and decodes it. It decodes in particular the number A.

The reader and the card use the same number A for calculating a duration T with the aid of the same secret key algorithm k; they also use this number for determining a particular pseudo-random sequence S among different possible sequences.

At the same time, the reader randomly generates a number representing a duration T', the duration of delay before the transmission of a synchronization pulse. It does not transmit this number to the card.

The reader then counts a duration T' after the end of the command sent to the card, and it transmits a short synchronization pulse at an instant t0 which is the end of this duration T'. From this instant, it starts the count of the duration T calculated previously.

The card, waiting for the synchronization pulse, receives and recognizes this pulse at an instant t'0; at this instant, it starts the count of the duration T that it has previously calculated.

At the instant t0+T the reader transmits a pseudo-random sequence which is the same as that which the card has to send. The sequence produced by the reader is then set to a reference instant t0+T.

At the instant t'0+T, the card transmits the pseudo-random sequence constituting the return signal.

The reader receives the sequence from the card and samples it with high temporal resolution (resolution corresponding to the accuracy with which it is wished to determine the instant of return of this sequence).

The reader temporally correlates the synthesized sequence and the received sequence, i.e. it searches to determine for which time interval it should offset the synthesized sequence, set to the time t0+T, for obtaining the maximum correlation with the received sequence. This is equivalent to saying that the reader produces a series of temporal sequences progressively offset with respect to the time t0+T, and that it searches to determine which of these sequences produces the best correlation with the sequence received.

This correlation search gives a time tr which is considered as the instant of reception of the return signal.

This time is compared with a theoretical instant tr0 of expected response from the card. According to the value of the difference between tr and tr0, the response is considered as authentic or otherwise as being the subject of a relay attack. In the first case, the dialog with the card can continue. In the second case, the reader prohibits further exchange with the card. The instant tr0 may be the instant t0+T if the reader assumes that the theoretical response of the card is extremely fast. Otherwise, this is an instant at tr+T0+ΔT slightly later than tr+T0.

The invention claimed is:

1. A method of protection of communication between a contactless card reader and a card, the method comprising:
   exchange between the reader and the card of information on a chosen value of duration T, measured with respect to a starting instant t0 seen from the reader side; the
   decoding of this information of a value of duration T by the card;
   sending by the card of a return signal, comprising a pseudo-random sequence known to the reader, temporally set with respect to an instant t'0+T, where t'0 is a starting instant as seen by the card taking into account delays in propagation or processing of signals received from the reader;
   detecting the return signal by the reader;
   determining the return signal with respect to the starting instant t0, including a search for maximum temporal correlation between the return signal and a pseudo-random sequence temporally offset with respect to the instant t0, the temporal setting of the return signal being the temporal offsetting of the sequence which provides a maximum of correlation; and
   interrupting communication by the reader if the temporal setting of the return signal detected is not equal to a theoretical instant of arrival of the return signal with a predetermined margin of error.

2. The method of protection as claimed in claim 1, wherein
   the reader and the card possess generators of identical pseudo-random sequences generated from a random number, and
   the random number is transmitted by the reader to the card so that the card and the reader establish identical pseudo-random sequences with a view to the search for correlation.

3. The method as claimed in claim 2, wherein the reader sends a command to the card, including sending a random number used to calculate both in the reader and in the card, by means of a same secret key algorithm, the duration T.

4. The method of protection as claimed in claim 2, wherein the instant t0 is a last modulation transition in a command sent by the reader before a response waiting time of the card.

5. The method of protection as claimed in claim 2, wherein the instant t0 is defined by a synchronization signal which follows, with a time interval T' having a value randomly generated by the reader, the end of a command sent by the reader.

6. The method as claimed in claim 2, wherein the card reader is fitted on a vehicle and controls opening and/or starting of the vehicle.

7. The method as claimed in claim 1, wherein the reader sends a command to the card, including sending a random number used to calculate both in the reader and in the card, by means of a same secret key algorithm, the duration T.

8. The method of protection as claimed in claim 7, wherein the instant t0 is defined by a synchronization signal which follows, with a time interval T' having a value randomly generated by the reader, the end of a command sent by the reader.

9. The method as claimed in claim 7, wherein the card reader is fitted on a vehicle and controls opening and/or starting of the vehicle.

10. The method of protection as claimed in claim 1, wherein the instant t0 is a last modulation transition in a command sent by the reader before a response waiting time of the card.

11. The method as claimed in claim 10, wherein the card reader is fitted on a vehicle and controls opening and/or starting of the vehicle.

12. The method of protection as claimed in claim 1, wherein the instant t0 is defined by a synchronization signal which follows, with a time interval T' having a value randomly generated by the reader, the end of a command sent by the reader.

13. The method as claimed in claim 12, wherein the card reader is fitted on a vehicle and controls opening and/or starting of the vehicle.

14. The method of protection as claimed in claim 1, wherein the information T is transmitted by the reader in encrypted form to the card, the card having corresponding means of decryption.

15. The method of protection as claimed in claim 14, wherein the information T is modified by the reader from one dialog sequence to another.

16. The method as claimed in claim 14, wherein the card reader is fitted on a vehicle and controls opening and/or starting of the vehicle.

17. The method of protection as claimed in claim 1, wherein the return signal from the card modulates a carrier frequency used in communication.

18. The method of protection as claimed in claim 17, wherein
   the modulation used in the exchanges between the reader and the card is a subcarrier amplitude modulation, and
   the return signal is transmitted in the form of a direct amplitude modulation of the carrier frequency, capable of being easily distinguished with respect to a subcarrier modulation.

19. The method of protection as claimed in claim 1, wherein the return signal from the card to the reader is a modulation of an electromagnetic field transmitted by the card itself.

20. The method as claimed in claim 1, wherein the card reader is fitted on a vehicle and controls opening and/or starting of the vehicle.

* * * * *